United States Patent
Akamatsu et al.

(10) Patent No.: US 12,043,020 B2
(45) Date of Patent: Jul. 23, 2024

(54) STITCHED FIBER-REINFORCED SUBSTRATE MATERIAL, PREFORM MATERIAL, FIBER REINFORCED COMPOSITE MATERIAL, AND MANUFACTURING METHOD FOR SAME

(71) Applicant: TEIJIN LIMITED, Osaka (JP)

(72) Inventors: Tetsuya Akamatsu, Osaka (JP); Kohei Osaki, Osaka (JP); Toru Kaneko, Osaka (JP)

(73) Assignee: TEIJIN LIMITED, Osaka (JP)

( * ) Notice: Subject to any disclaimer, the term of this patent is extended or adjusted under 35 U.S.C. 154(b) by 169 days.

(21) Appl. No.: 17/800,658

(22) PCT Filed: Feb. 22, 2021

(86) PCT No.: PCT/JP2021/006532
§ 371 (c)(1),
(2) Date: Aug. 18, 2022

(87) PCT Pub. No.: WO2021/172247
PCT Pub. Date: Sep. 2, 2021

(65) Prior Publication Data
US 2023/0349083 A1     Nov. 2, 2023

(30) Foreign Application Priority Data

Feb. 28, 2020   (JP) ................. 2020-033682

(51) Int. Cl.
*B32B 5/06* (2006.01)
*B29C 70/40* (2006.01)
*B32B 5/12* (2006.01)
*B32B 27/12* (2006.01)

(52) U.S. Cl.
CPC ............... *B32B 5/06* (2013.01); *B29C 70/40* (2013.01); *B32B 5/12* (2013.01); *B32B 27/12* (2013.01); *B32B 5/073* (2021.05); *Y10T 428/24033* (2015.01)

(58) Field of Classification Search
None
See application file for complete search history.

(56) References Cited

FOREIGN PATENT DOCUMENTS

| EP | 3 118 370 A1 | 1/2017 |
|---|---|---|
| JP | 2012-511450 A | 5/2012 |
| JP | 2013-522486 A | 6/2013 |
| WO | 2017/104481 A1 | 6/2017 |
| WO | 2018/083734 A1 | 5/2018 |
| WO | 2020/031834 A1 | 2/2020 |

OTHER PUBLICATIONS

Pierre-Jacques Liotier et al., "Microcracking of composites reinforced by stitched multiaxials subjected to cyclical hygrothermal loadings", Composites: Part A, 2011, pp. 425-437, vol. 42.
International Search Report of PCT/JP2021/006532 dated May 11, 2021 [PCT/ISA/210].
International Preliminary Report on Patentability dated Aug. 30, 2022 with a Translation of the Written Opinion of the International Searching Authority in Application No. PCT/JP2021/006532.
Supplementary European Search Report dated Jul. 12, 2023 in European Application No. 21761777.8.
European Examination Report dated Jul. 24, 2023 in European Application No. 21761777.8.

*Primary Examiner* — Alexander S Thomas
(74) *Attorney, Agent, or Firm* — Sughrue Mion, PLLC

(57) ABSTRACT

An object of the present invention is to provide a stitched fiber-reinforced substrate material capable of suppressing the formation of microcracks in a fiber reinforced composite material. The stitched fiber-reinforced substrate material of the present invention is a stitched fiber-reinforced substrate material formed by stitching reinforcement fiber sheets made of reinforcement fibers using stitching yarns, to which an organic compound having a polar group is adhered. The organic compound having a polar group is preferably a compound having a polyoxyalkylene structure, and also preferably a compound having an epoxy group. The organic compound having a polar group is preferably adhered in an amount of 0.1 to 10 wt % with respect to the mass of the stitching yarn.

13 Claims, No Drawings

STITCHED FIBER-REINFORCED SUBSTRATE MATERIAL, PREFORM MATERIAL, FIBER REINFORCED COMPOSITE MATERIAL, AND MANUFACTURING METHOD FOR SAME

CROSS REFERENCE TO RELATED APPLICATIONS

This application is a National Stage of International Application No. PCT/JP2021/006532, filed Feb. 22, 2021, claiming priority to Japanese Patent Application No. 2020-033682, filed Feb. 28, 2020.

TECHNICAL FIELD

The present invention relates to a stitched fiber-reinforced substrate material, a preform material, and a fiber reinforced composite material, and a manufacturing method for the same. More specifically, the present invention relates to a stitched fiber-reinforced substrate material which is formed by integrating multiple reinforcement fiber layers using stitching yarns, a preform material and a fiber reinforced composite material containing the stitched fiber-reinforced substrate material.

BACKGROUND ART

The fiber reinforced composite material, due to its lightness in weight, high strength, and high rigidity, is used in a wide range of fields, including sports/leisure applications, such as fishing rods and golf shafts, and industrial applications, such as automobiles and aircraft. There is adopted a method for molding a fiber reinforced composite material: molding prepreg (intermediate substrate material) which is formed into a sheet in advance by impregnating a fiber-reinforced substrate material with resin. Other molding methods include a resin transfer molding (RTM) method: impregnating a fiber-reinforced substrate material in a molding die with a liquid resin formulation and curing or solidifying the resin to obtain a fiber reinforced composite material.

Since the fiber reinforced composite material preferably has isotropy, the fiber-reinforced substrate material is preferably composed of multiple layers having different fiber axial directions. Examples of the fiber-reinforced substrate material composed of multiple layers include woven or knitted fabrics and multiaxial woven fabrics. The fiber-reinforced substrate material made of such a woven fabric causes the reinforcement fibers to be crimp at the intersection of the warp and the weft and then to lower the linearity, which may result in insufficiently high mechanical properties of the obtained fiber reinforced composite material. On the other hand, in the stitched fiber-reinforced substrate material, since a laminate is made by laminating multiple reinforcement fiber sheets made of unidirectionally drawn and aligned reinforcement fiber and the laminate is stitched through the laminate in the direction of thickness using a stitching yarn, and thus multiple reinforcement fiber sheets is integrated, the reinforcement fibers are unlikely to be crimp, and thus the mechanical properties of the obtained fiber reinforced composite material are easily improved.

However, when a fiber reinforced composite material is produced using such a stitched fiber-reinforced substrate material, microcracks may be generated around the stitching yarn. This microcrack may gradually develop and lower the mechanical properties of the fiber reinforced composite material.

Various studies have been made to suppress the generation of this microcrack. PTL 1 discloses that the formation of microcracks can be suppressed in the obtained fiber reinforced composite material by using a stitching yarn having a small yarn count, specifically 30 dTex or less.

NPL 1 discloses that the formation of microcracks can be suppressed by reducing the resin-rich part in the fiber reinforced composite material as much as possible to improve the toughness of the interface between the stitching yarn and the matrix resin.

However, even if these techniques are used, the effect of suppressing microcracks generated at the interface between the stitching yarn and the matrix resin phase has been still unsatisfactory.

SUMMARY OF INVENTION

Technical Problem

An object of the present invention is to provide a stitched fiber-reinforced substrate material capable of suppressing the formation of microcracks in a fiber reinforced composite material.

Solution to Problem

As a result of studies to solve the above problems, the present inventors have found that many microcracks are generated at the interface between the stitching yarn and the matrix resin phase. Therefore, they examined the stitching yarns constituting the stitched fiber-reinforced substrate material and have found that the formation of microcracks can be reduced by using a stitching yarn to which an organic compound having a polar group is adhered, and have completed the present invention.

The present invention that achieves the above object is a stitched fiber-reinforced substrate material formed by stitching reinforcement fiber sheets made of reinforcement fibers using stitching yarns, wherein an organic compound having a polar group is adhered to the stitching yarn. In the present invention, the organic compound having a polar group is preferably a compound having a polyoxyalkylene structure, and also preferably a compound having an epoxy group. The organic compound having a polar group is preferably adhered in an amount of 0.1 to 10 wt % with respect to the mass of the stitching yarn. There is preferably used a stitching yarn having a linear expansion coefficient of $-1\times10^{-6}$ to $70\times10^{-6}$/K in the fiber axial direction after heated at 180° C. for 2 hours and then cooled.

In the present invention, the reinforcement fiber sheet is preferably a reinforcement fiber sheet made of unidirectionally drawn and aligned reinforcement fiber, and the reinforcement fiber sheets made of unidirectionally drawn and aligned reinforcement fiber are more preferably laminated layer by layer by altering the fiber axial direction.

The present invention includes a method for manufacturing a stitched fiber-reinforced substrate material by stitching a reinforcement fiber sheet made of reinforcement fiber using stitching yarns to which an organic compound having a polar group is adhered, and a preform material composed of the stitched fiber-reinforced substrate material of the present invention and a binder resin, and a fiber reinforced composite material composed of the stitched fiber-reinforced substrate material of the present invention and a matrix resin.

Advantageous Effects of Invention

The fiber reinforced composite material produced using the stitched fiber-reinforced substrate material of the present invention significantly suppresses the formation of microcracks due to stitching yarn. Therefore, the mechanical properties of the fiber reinforced composite material can be kept high.

DESCRIPTION OF EMBODIMENTS

Hereinafter, the stitched fiber-reinforced substrate material, the preform material, and the fiber reinforced composite material of the present invention, and the manufacturing method thereof will be described.

1. Stitched Fiber-Reinforced Substrate Material

The stitched fiber-reinforced substrate material of the present invention is formed by stitching reinforcement fiber sheets using stitching yarns. In the present invention, the stitching yarn is a stitching yarn to which an organic compound having a polar group is adhered. Use of such a stitching yarn can reduce, at the interface between the single yarn of the stitching yarn and the matrix resin constituting the fiber reinforced composite material, local stress concentration especially due to thermal shock. Therefore, in the obtained fiber reinforced composite material, the formation of microcracks due to stitching yarn can be suppressed.

The weight per area of the stitched fiber-reinforced substrate material of the present invention is preferably 200 to 2000 $g/m^2$, and more preferably 200 to 1000 $g/m^2$. The thickness of the stitched fiber-reinforced substrate material, though appropriately selected depending on the intended use and the like of the molded product, is usually preferably 0.1 to 2 mm.

1-1. Stitching Yarn

In the present invention, the stitching yarn is a stitching yarn to which an organic compound having a polar group is adhered. Use of a stitching yarn to which an organic compound having a polar group is adhered can reduce, at the interface between the single yarn of the stitching yarn and the thermosetting resin constituting the fiber reinforced composite material, generation of interfacial delamination especially due to thermal shock, and the subsequent local stress concentration. Therefore, use of such a stitching yarn in a stitched fiber-reinforced substrate material can suppress the formation of microcracks due to stitching yarn in the obtained fiber reinforced composite material.

In the present invention, the organic compound is not particularly limited as long as it has a polar group, and may be an aliphatic compound or an aromatic compound. It may also be a hetero compound. From the viewpoint of the adhesiveness between the stitching yarn and the matrix resin, a compound composed of carbon and hydrogen is preferable, and a compound containing oxygen and nitrogen as heteroatom may be used. The compound preferably has a total content of 90% or more of carbon, hydrogen, oxygen, and nitrogen. From the viewpoint of the adhesiveness between the stitching yarn and the matrix resin, an aliphatic compound is preferable, and a compound having a polyoxyalkylene structure is more preferable.

In the present invention, the polar group contained in the organic compound having a polar group may be appropriately selected in consideration of affinity with the matrix resin, and examples thereof include hydroxy group, amino group, phenol group, lactam group, and epoxy group. When a curable resin is used as the matrix resin, the polar group is preferably a polar group that reacts with the matrix resin at curing to form a covalent bond.

Too high reactivity of the polar group may impair stability as a treatment agent for applying the organic compound to the fiber, and thus the polar group is more preferably a hydroxy group, phenol group or epoxy group. When the stitching yarn is used in combination with an epoxy resin as a matrix resin for a composite material, the polar group is particularly preferably an epoxy group.

Further, the organic compound preferably has a plurality of polar groups. The number of polar groups is preferably 2 or more. The upper limit of the number of polar groups is not particularly limited, but the amount of functional groups of 50 mmol/g is sufficient, and more preferably 25 mmol/g or less. Most preferably, the two polar groups are present at both ends of the organic compound. When two or more polar groups are present, the stitching yarn and the matrix resin are adhered to each other by the organic compound, and the formation of microcracks due to stitching yarn is more easily suppressed.

In the present invention, the aliphatic compound is an acyclic linear saturated hydrocarbon, a branched saturated hydrocarbon, an acyclic linear unsaturated hydrocarbon, a branched unsaturated hydrocarbon, or a compound having a chain structure which is given by replacing the carbon atoms ($CH_3$, $CH_2$, CH, C) of the above-mentioned hydrocarbon with oxygen atoms (O), nitrogen atoms (NH, N), sulfur atoms ($SO_3H$, SH), and carbonyl atomic groups (CO); the aliphatic alcohol refers to an aliphatic compound having a hydroxy group as a functional group, and the aliphatic polyol refers to an aliphatic compound having two or more hydroxy groups.

The aliphatic compound used in the present invention is not particularly limited, but is preferably an acyclic linear hydrocarbon. Further, a compound having only an oxygen atom (O) as heteroatom is preferable excluding unavoidable impurities, and a compound having a polyoxyalkylene group (polyoxyalkylene structure), such as a polyoxyethylene group, is more preferable.

The degree of polymerization of the polyoxyalkylene group is not particularly limited, but taking an example of an oxyethylene group, in consideration of the scratching characteristics of the stitching yarn after the treatment agent is applied, an organic compound having an average degree of polymerization n of 15 or more is preferably contained, and more preferably an average degree of polymerization n of 20 or more. The upper limit of the average degree of polymerization n is not particularly limited, but n of 50 is sufficient from the viewpoint of handleability as a treatment agent. On the other hand, in consideration of the interfacial adhesion characteristics between the stitching yarn and the matrix resin after the treatment agent is applied, an organic compound having an average degree of polymerization n of 30 or less is preferably contained, and more preferably an average degree of polymerization n of 15 or less. In this case, the lower limit of the average degree of polymerization n is not particularly limited, but n of 5 is sufficient from the viewpoint of handleability as a treatment agent.

Examples of the organic compound having an epoxy group as a polar group include an aromatic epoxy compound having an aromatic group and an aliphatic epoxy compound consisting only of an aliphatic group. In the present invention, one or more kinds of aliphatic epoxy compounds are preferably contained.

Examples of the aliphatic epoxy compound include glycidyl ether compound, obtained by reacting an aliphatic alcohol or an aliphatic polyol with epihalohydrin, such as monoglycidyl ether compound, diglycidyl ether compound, and polyglycidyl ether compound.

Examples of the diglycidyl ether compound include ethylene glycol diglycidyl ether and polyethylene glycol diglycidyl ethers, propylene glycol diglycidyl ether and polypropylene glycol diglycidyl ethers, 1,4-butanediol diglycidyl ether, neopentyl glycol diglycidyl ether, polytetramethylene glycol diglycidyl ether, and polyalkylene glycol diglycidyl ethers.

Examples of the polyglycidyl ether compound include glycerol polyglycidyl ether, diglycerol polyglycidyl ether, polyglycerol polyglycidyl ethers, sorbitol polyglycidyl ethers, arabitol polyglycidyl ethers, trimethylolpropane polyglycidyl ethers, pentaerythritol polyglycidyl ethers, and polyglycidyl ethers of aliphatic polyhydric alcohol.

The number average molecular weight of the organic compound, in consideration of the scratching characteristics of the stitching yarn after the treatment agent is applied, is preferably 400 or more, more preferably 450 or more and 2000 or less, and particularly preferably 700 or more and 1500 or less. As a result, the handleability of the stitching yarn is improved, and the processability of the stitch processing can also be improved. On the other hand, in consideration of the interfacial adhesion property between the stitching yarn and the matrix resin after the treatment agent is applied, the number average molecular weight of the organic compound is preferably 2000 or less, more preferably 200 or more and 1600 or less, and particularly preferably 300 or more and 1300 or less. As a result, the interfacial adhesion property between the stitching yarn and the matrix resin is improved, and the microcrack resistance of the stitch processing can also be improved. The number average molecular weight M is calculated by the following equation (1).

$$M = 1/\Sigma(\text{weight fraction of resin } i/\text{molecular weight of resin } i) \quad (1)$$

Note that, i is a natural number from 1 to k, and k is the number of kinds of organic compounds.

In the present invention, an organic compound having a molecular weight of 1000 or more is preferably contained. When the molecular weight is high, the molecule of the organic compound becomes large and easily stays on the surface of the stitching yarn when the treatment agent is applied, thereby allowing the surface of the stitching yarn to be covered efficiently.

The content of the organic compound having a molecular weight of 1000 or more is preferably 30 wt % or more, more preferably in the range of 40 to 90 wt %, and still more preferably in the range of 50 to 80 wt %, with respect to the total amount of the organic compounds.

Further, an organic compound having a molecular weight of 500 or less is preferably contained, and an organic compound having a molecular weight of 350 or less is more preferably contained. When the molecular weight is low, the molecules of the organic compound are small, and thus the treatment agent easily permeates between the single fibers of the stitching yarn, which enables the improved adhesion uniformity of the treatment agent. The content of the organic compound having a molecular weight of 500 or less is preferably 10 wt % or more, and more preferably in the range of 20 to 50 wt %, with respect to the total amount of the organic compounds.

In the present invention, the stitching yarn may contain, in addition to the organic compound having a polar group, a fiber oiling agent applied in the process of manufacturing the stitching yarn. It is preferable from the viewpoint of suppressing the formation of microcracks due to stitching yarn to use a stitching yarn prepared by applying an organic compound having a polar group to the stitching yarn which does not contain such a fiber oiling agent or from which the previously applied fiber oiling agent has been removed in advance. Here, the condition that the stitching yarn does not contain the fiber oiling agent means that the adhered amount of the oiling agent other than the organic compound having a polar group is 1% by mass or less. Further, a hydrophilic treatment is also preferably performed as necessary on the stitching yarn, before the compound having a polar group is applied, to improve hydrophilicity of the surface of the fiber and thus to improve adhesiveness with the matrix resin. Examples of the hydrophilic treatment include corona treatment and plasma treatment.

The adhered amount of the organic compound having a polar group is preferably in the range of 0.1 to 10 wt %, more preferably in the range of 1 to 8 wt %, and still more preferably in the range of 2.5 to 7 wt %, with respect to the total mass of the stitching yarn. The adhered amount of the treatment agent within this range allows easier suppression of the formation of microcracks due to stitching yarns. Too small an adhered amount of the treatment agent may lower the adhesion properties between the stitching yarn and the matrix resin in the composite material, while too much an adhered amount of the treatment agent may lower the handleability of the stitching yarn and thus lower the productivity of the stitched fiber-reinforced substrate material.

The method for applying the compound having a polar group, though not limited by the following examples, may be performed, for example, by applying a solution containing the compound having a polar group (hereinafter referred to as "treatment agent solution") to a stitching yarn by a roller dipping process or a roller contact process and then drying, or by spraying the treatment agent solution onto a stitching yarn. The roller dipping process can be preferably used in terms of the productivity and uniform adhesion. The solvent of the treatment agent solution is not particularly limited as long as the solvent can dissolve or disperse the organic compound having a polar group, but water is preferable from the viewpoint of handleability and safety. Examples of the aqueous treatment agent solution include a water-soluble treatment agent solution in which a water-soluble compound is dissolved in water, an emulsion-based treatment agent solution in which an organic compound is emulsified with an emulsifier, and a suspension-based treatment agent solution in which a particulate organic compound is dispersed in water, and the water-soluble treatment agent solution is preferably used.

Use of the water-soluble organic compound lowers the viscosity of the treatment agent solution, and thus improves the permeability of the treatment agent into the fiber bundles. In particular, when the treatment agent contains an aliphatic epoxy compound having a molecular weight of 500 or less, preferably 350 or less, the treatment agent becomes to be easily penetrated between the fiber bundles. The viscosity of the organic compound as a formulation excluding the solvent is preferably in the range of 20 to 200 mPa·s, and more preferably in the range of 40 to 150 mPa·s.

The thickness of film of the treatment agent formed on the surface of the stitching yarn is preferably in the range of 2 to 100 nm, and more preferably in the range of 4 nm to 50 nm.

The stitching yarn after being treated with the treatment agent solution is subjected to a drying treatment to evaporate the solvent and the like of the treatment agent solution. An air dryer is preferably used for drying. The drying temperature is not particularly limited, but in the case of a general-purpose aqueous treatment agent solution, the temperature is usually set in the range of 100 to 180° C. In addition, the drying step may be followed by a heat treatment step at 200° C. or higher.

The type of fiber used as the stitching yarn in the present invention is not particularly limited, and there is preferably used polyolefin fiber, such as polyethylene fiber and polypropylene fiber, polyamide fiber, such as aliphatic polyamide fiber, semi-aromatic polyamide fiber, and fully aromatic polyamide fiber, polyester fiber, cellulose fiber, and the like.

Among these fibers, a fiber having a polar group in the chemical structure of the compound constituting the fiber is preferably used. The fiber having a polar group in the chemical structure has an excellent affinity with the matrix resin, and the interfacial delamination between the stitching yarn and the matrix resin is suppressed more easily. As the polar group, hydroxy group, epoxy group, ester group, amino group, amide group, and the like are preferably mentioned. Among these, fibers having a hydroxy group or amide group are particularly preferable. Such a polar group may be contained in the main chain or the side chain of the chemical structure of the compound constituting the fiber, but is preferably contained in the main chain from the viewpoint of improving the adhesiveness with the matrix resin.

Further, when a thermosetting resin is used as the matrix resin, and a reactive group such as a hydroxy group, amino group, or epoxy group is contained in the fiber as the polar group, the reactive group contained in the fiber and the thermosetting resin react to form a covalent bond at the interface between the matrix resin and the fiber in the process of manufacturing the fiber reinforced composite material, thereby further improving the interfacial adhesiveness between the stitching yarn and the matrix resin.

The stitching yarn used in the present invention is preferably a stitching yarn having an amorphous structure on the fiber surface, and is also preferably a stitching yarn having pores on the fiber surface. The amorphous structure and the pore structure on the fiber surface are easily impregnated with the matrix resin, which enhances the interfacial adhesiveness between the stitching yarn and the matrix resin, and the interfacial delamination between the stitching yarn and the matrix resin is suppressed more easily.

In the present invention, the stitching yarn is preferably a stitching yarn having a linear expansion coefficient in the fiber axial direction of $-1 \times 10^{-6}$ to $70 \times 10^{-6}$/K after heated at 180° C. for 2 hours and then cooled, and more preferably $5 \times 10^{-6}$ to $50 \times 10^{-6}$/K. In the present invention, the linear expansion coefficient is a linear expansion coefficient measured in the temperature range of −50 to 70° C. Further, the linear expansion coefficient of the stitching yarn is preferably equal to or less than the linear expansion coefficient of the matrix resin (CTEm ($\times 10^{-6}$/K)) to be combined when forming the fiber reinforced composite material, and is preferably set to in the range of CTEm ($\times 10^{-6}$/K) to (CTEm−30) ($\times 10^{-6}$/K). Further, the linear expansion coefficient of the stitching yarn is also preferably equal to or more than the linear expansion coefficient in the fiber direction of the reinforcement fiber (CTEf ($\times 10^{-6}$/K)) used for the reinforcement fiber sheet, and is preferably set to in the range of CTEf ($\times 10^{-6}$/K) to (CTEf+30) ($\times 10^{-6}$/K).

When a stitching yarn having such a linear expansion coefficient is used, the difference in the volume change due to thermal expansion between the stitching yarn and the matrix resin phase is small, which makes it unlikely to cause generation of internal stress and interfacial delamination at the interface between the stitching yarn and the matrix resin phase. Use of the stitching yarn having such a linear expansion coefficient allows further suppression of the interfacial delamination between the stitching yarn and the resin constituting the fiber reinforced composite material.

The linear expansion coefficient of the stitching yarn can be adjusted by the linear expansion coefficient characteristic to the material of the fiber to be used, and the drawing treatment or heat treatment applied to the fiber when the fiber is manufactured. When using a fiber having a glass transition temperature (Tg) or a softening point of 180° C. or less as the stitching yarn of the present invention, the fiber is preferably selected so that the linear expansion coefficient characteristic to the fiber is within a desired range because the selection facilitates adjusting the linear expansion coefficient of the stitching yarn within the desired range. On the other hand, when using a fiber having a Tg or a softening point of over 180° C. or a fiber having no Tg as the stitching yarn, the linear expansion coefficient can be adjusted to be a desired value by the drawing treatment or heat treatment when the fiber is manufactured.

The fineness of the stitching yarn, though not particularly specified, is preferably 10 to 70 dTex, and more preferably 15 to 40 dTex. The single yarn diameter of the stitching yarn is preferably 10 to 40 μm. The number of filaments in the stitching yarn is preferably 1 to 50 and more preferably 4 to 24.

The stitched fiber-reinforced substrate material of the present invention preferably uses the stitching yarn at an amount of preferably 1 to 10 g/m², and more preferably 2 to 5 g/m².

1-2. Reinforcement Fiber Sheet

For the reinforcement fiber sheet used in the present invention, there can be used materials used for ordinary fiber reinforced material, such as carbon fiber, glass fiber, aramid fiber, boron fiber, and metal fiber. Among these, carbon fiber is preferable. A reinforcement fiber having a linear expansion coefficient (CTEf) in the fiber direction in the range of $-10 \times 10^{-6}$ to $10 \times 10^{-6}$/K is preferably used.

In the present invention, as the reinforcement fiber sheet, a reinforcement fiber sheet obtained by processing a continuous fiber bundle of reinforcement fiber into a sheet shape is preferably used, and a reinforcement fiber sheet composed of unidirectionally drawn and aligned reinforcement fiber is more preferably used. Further, it is particularly preferable to use a reinforcement fiber sheet (laminate substrate material) in which reinforcement fiber sheets made of unidirectionally drawn and aligned reinforcement fiber are laminated layer by layer by altering the fiber axial direction. Although the reinforcement fibers constituting the reinforcement fiber sheet may be partially cut by making a notch and the like in the sheet in order to enhance shapeability of the sheet when molding the composite material, the reinforcement fiber is still used preferably in a continuous-fiber state from the viewpoint of improving the physical properties of the obtained composite material. Even when the reinforcement fiber is cut and used, the fiber length of the reinforcement fiber is preferably maintained at 10 cm or more.

The laminate structure of the reinforcement fiber sheets is such that the sheets are preferably laminated layer by layer by altering the fiber axial direction of the reinforcement fiber, and more preferably laminated by altering the fiber axial direction to an appropriately selected angle from 0°, ±45°, and 90°. These angles mean that the fiber axial directions of thread line of the reinforcement fiber are at 0°, ±45°, and 90° with respect to a predetermined direction of the stitched fiber-reinforced substrate material, respectively. The reinforcement fiber sheet is particularly preferable to have a laminate structure of −45°, 0°, +45°, 90°, 90°, +45°, 0°, −45°. Lamination at such angles can enhance isotropy of the obtained fiber reinforced composite material. The number of lamination of reinforcement fiber sheets is not limited, but is preferably about 2 to 8 layers.

The stitched fiber-reinforced substrate material of the present invention is given by stitching the above reinforcement fiber sheet using stitching yarns. The stitching method of the stitched fiber-reinforced substrate material is not particularly limited, but preferably, multiple reinforcement fiber sheets is stitched up using the stitching yarns, and more preferably, all the reinforcement fiber sheets are stitched and integrated using the stitching yarns.

Each reinforcement fiber sheet used in the present invention is preferably composed of only a thread line of unidirectionally drawn and aligned reinforcement fiber, and no other thread line (weft) is preferably used in the direction other than the unidirection. Unidirectional drawing and aligning of the reinforcement fiber improves linearity of thread line of the reinforcement fiber, and thus improves the mechanical properties of the obtained fiber reinforced composite material. Further, after the fiber reinforced composite material is formed, generation of the resin-rich part is suppressed, and thus formation of microcracks is easily suppressed.

In the stitched fiber-reinforced substrate material of the present invention, a binder resin for forming a preform may be adhered on the surface of the reinforcement fiber sheet, and a resin sheet, non-woven fabric, or the like may be further laminated.

The stitched fiber-reinforced substrate material of the present invention can be manufactured by stitching the reinforcement fiber sheet described above using a stitching yarn to which an organic compound having a polar group is adhered.

2. Preform Material

When the fiber reinforced composite material is molded using the stitched fiber-reinforced substrate material of the present invention, the stitched fiber-reinforced substrate material can be used as it is, but, from the viewpoint of handleability and workability, there is preferably used a preform material that is obtained by stacking the stitched fiber-reinforced substrate material and pre-shaping the stack.

The preform material is manufactured by the following process: the stitched fiber-reinforced substrate material of the present invention, or the stitched fiber-reinforced substrate material of the present invention and another fiber-reinforced substrate material are stacked on one face of the preform production die to a desired thickness, a powder of a resin (binder resin) to be a binder is sprayed or a resin sheet of a binder resin is laminated as necessary, and the stack is preformed by heating under pressure by a press or the like which uses a heating plate or the like. The resin to be a binder is melted by heating, and the stitched fiber-reinforced substrate materials of the present invention among themselves, or the stitched fiber-reinforced substrate material of the present invention and another reinforcement fiber sheet are molded together after the preforming die to give a preform material retaining the shape of the preforming die.

The resin material used as the binder resin is not particularly limited, and thermosetting resins, such as epoxy resin and vinyl ester resin, thermoplastic resins, such as polyamide and polyethersulfone, and mixtures thereof can be appropriately used. These resins may be used by spraying powder, or may be formed as a sheet, non-woven fabric, or the like and laminated on the stitched fiber-reinforced substrate material of the present invention. Alternatively, it may be adhered in advance to each thread line of the reinforcement fiber constituting the stitched fiber-reinforced substrate material of the present invention.

The amount of the binder resin constituting the preform material is preferably 1 to 20 parts by mass, and more preferably 5 to 10 parts by mass with respect to 100 parts by mass of the stitched fiber-reinforced substrate material of the present invention. The thickness of the preform material varies depending on the purpose of use, but is preferably 1 to 40 mm.

The preform material can be made into a fiber reinforced composite material by a known molding method, such as a resin transfer molding method (RTM method) or a resin film infusion molding method (RFI method). The preform material produced by the above methods retains its three-dimensional shape even after preforming. Therefore, the preform material can be moved from the preform production die to the fiber reinforced composite material production die without losing the shape. Accordingly, there is no need of stacking directly on the molding die used for production of the fiber reinforced composite material, which can reduce the occupancy time of the molding die, and thus productivity of the fiber reinforced composite material is improved.

3. Fiber Reinforced Composite Material (FRP)

The fiber reinforced composite material of the present invention comprises the stitched fiber-reinforced substrate material of the present invention and a matrix resin formulation. The fiber reinforced composite material is produced by molding the stitched fiber-reinforced substrate material and the matrix resin formulation while they are in a composite state. The fiber reinforced composite material is produced by impregnating the stitched fiber-reinforced substrate material of the present invention with the matrix resin formulation and molding the stitched substrate material and the matrix resin formulation while they are in a composite state. The method for producing the fiber reinforced composite material is not particularly limited, and there may be molded a prepreg in which a matrix resin formulation is impregnated in advance into a fiber-reinforced substrate material, and the fiber-reinforced substrate material and the matrix resin formulation may be simultaneously molded and composited using a resin transfer molding method (RTM method), a resin film infusion molding method (RFI method) or the like. The stitched fiber-reinforced substrate material of the present invention can be preferably used in a molding method such as RTM method and RFI method. The linear expansion coefficient of the matrix resin (CTEm) is preferably $40 \times 10^{-6}$ to $70 \times 10^{-6}$/K.

As the matrix resin used in the present invention, a thermosetting resin or a thermoplastic resin is used. Specific examples of the thermosetting matrix resin include epoxy resin, unsaturated polyester resin, phenol resin, melamine resin, polyurethane resin, silicone resin, maleimide resin, vinyl ester resin, cyanate ester resin, resin prepolymerized from maleimide resin and cyanate ester resin, urethane acrylate resin, phenoxy resin, alkyd resin, urethane resin, bismaleimide resin, polyimide resin and polyisoimide resin having an acetylene terminal, and polyimide resin having a nadic acid terminal. These can also be used as one kind or a mixture of two or more kinds. Among these, epoxy resin, vinyl ester resin, bismaleimide resin, and polyimide resin which have excellent heat resistance, elastic modulus, and chemical resistance are particularly preferable. In addition to the curing agent and the curing accelerator, these thermosetting resins may contain commonly used colorants, various additives, and the like. In order to improve the impact resistance of the matrix resin, a thermoplastic resin is preferably contained.

Examples of the thermoplastic resin used as the matrix resin include polypropylene, polysulfone, polyethersulfone, polyetherketone, polyetheretherketone, polyetherketoneketone, aromatic polyamide, aromatic polyester, aromatic polycarbonate, polyetherimide, polyarylene oxide, thermoplastic polyimide, polyamide, polyamide-imide, polyacetal, polyphenylene sulfide, polyarylate, polyacrylonitrile, and polybenzimidazole.

The fiber reinforced composite material of the present invention is produced preferably using RTM method from the viewpoint of efficient production for a complicated-shaped fiber reinforced composite material. Here, RTM method means the following method: the stitched fiber-reinforced substrate material is placed in the molding die, then impregnated with an uncured thermosetting resin formulation in liquid state or a molten thermoplastic resin formulation as a matrix resin, and then the matrix resin is cured or solidified to obtain fiber reinforced composite material.

In the present invention, the mold used in RTM method may be a closed mold made of a rigid material, or an open mold made of a rigid material and a flexible film (bag) can also be used. In the latter case, the stitched fiber-reinforced substrate material can be placed between the open mold of the rigid material and the flexible film. As the rigid material, there are used various existing materials including metal, such as steel and aluminum, fiber reinforced plastic (FRP), wood, and gypsum. Polyamide, polyimide, polyester, fluororesin, silicone resin and the like are used as material of the flexible film.

In RTM method, when a closed mold of a rigid material is used, the mold is usually pressed and clamped, and then the matrix resin formulation is pressurized and injected. At this time, a suction port may be provided in addition to the injection port and connected to a vacuum pump for suction. The matrix resin formulation may be injected only by atmospheric pressure due to suction without use of special pressurizing means. This method can be suitably used to manufacture a large-sized member by providing a plurality of suction ports.

In RTM method, when an open mold of a rigid material and a flexible film are used, the matrix resin formulation may be injected only by atmospheric pressure due to suction without use of special pressurizing means. A resin distribution medium is effectively used to realize good impregnation for injection only by atmospheric pressure. Further, a gel coat is preferably applied to the surface of the rigid material before placing the stitched fiber-reinforced substrate material.

In RTM method, when a thermosetting resin is used as the matrix resin, the stitched fiber-reinforced substrate material is impregnated with the matrix resin formulation and then heat-cured. The mold temperature at heat curing is usually selected to be higher than that at injecting the thermosetting resin formulation. The mold temperature at heat curing is preferably 80 to 200° C. The heat curing time is preferably 1 minute to 20 hours. After the heat curing is completed, the fiber reinforced composite material is demold and taken out. Then, the obtained fiber reinforced composite material may be heated at a higher temperature for postcure. The postcure temperature is preferably 150 to 200° C., and the time is preferably 1 minute to 4 hours.

When an epoxy resin is used as the matrix resin, the impregnation pressure for impregnating the epoxy resin formulation into the stitched fiber-reinforced substrate material by RTM method is appropriately determined in consideration of the viscosity/resin flow and the like of the resin formulation. The specific impregnation pressure is 0.001 to 10 MPa and preferably 0.01 to 1 MPa. When the fiber reinforced composite material is obtained by RTM method, the viscosity of the epoxy resin formulation at 100° C. is preferably less than 5000 mPa·s, and more preferably 1 to 1000 mPa·s.

The amount of the matrix resin formulation is preferably 20 to 60 parts by mass and more preferably 30 to 40 parts by mass with respect to 100 parts by mass of the stitched fiber-reinforced substrate material.

In the present molding method, the viscosity of the matrix resin formulation is preferably 0.01 to 1 Pa·s at the injection temperature. The viscosity at injection of the resin to be injected is preferably adjusted within the above range by a method such as preheating.

The fiber reinforced composite material thus obtained becomes a composite material having suppressed generation of microcracks. The crack density of the composite material is preferably low, specifically, the crack density is preferably 0.30 cracks/(cm·ply) or less, more preferably 0.20 cracks/(cm·ply) or less, and further preferably 0.15 cracks/(cm·ply) or less.

EXAMPLES

Hereinafter, the present invention will be described in more detail by way of examples, but the present invention is not limited to the examples. The components and test methods used in this example and comparative example are described below.

[Stitching Yarn]

Stitching yarn 1: Polyamide fiber made by EMS-CHEMIE, Grilon (registered trademark), K-178, 23T4, Fineness: 23 dTex, Number of single filaments: 4

Stitching yarn 2: Liquid crystal polyester fiber manufactured by KB Seiren Ltd., Zxion (registered trademark), 28T6, Fineness: 28 dTex, Number of single filaments: 6

Stitching yarn 3: Cuprammonium rayon fiber (cellulose fiber) manufactured by Asahi Kasei Corporation, Bemberg (registered trademark), 33T24, Fineness: 33 dTex, Number of single filaments: 24

[Treatment Agent Solution]

Oiling agent 1: 50 wt % acetone solution of aromatic epoxy compound "jER-827" (registered trademark) (bisphenol A type epoxy resin manufactured by Mitsubishi Chemical Co., Ltd., Number of epoxy groups: 2, Epoxy equivalent: 180-190 g/Eq) (weight ratio of bisphenol A type epoxy resin/acetone=1/1)

Oiling agent 2: 5 wt % aqueous solution of aliphatic epoxy compound "Denacol" (registered trademark) EX832 (polyoxyethylene diglycidyl ether manufactured by Nagase ChemteX Corporation, Number of epoxy groups: 2, Epoxy equivalent: 284 g/Eq, Average degree of polymerization of polyoxyethylene groups n: 9) (weight ratio of polyoxyethylene diglycidyl ether/water=1/19)

Oiling agent 3: 50 wt % aqueous solution of aliphatic epoxy compound "Denacol" (registered trademark) EX832 (polyoxyethylene diglycidyl ether manufactured by Nagase ChemteX Corporation, Number of epoxy groups: 2, Epoxy equivalent: 284 g/Eq, Average degree of polymerization of polyoxyethylene groups n: 9) (weight ratio of polyoxyethylene diglycidyl ether/water=1:1)

Oiling agent 4: 5 wt % aqueous solution of aliphatic epoxy compound "Denacol" (registered trademark) EX861 (polyoxyethylene diglycidyl ether manufactured by Nagase ChemteX Corporation, Number of epoxy groups: 2, Epoxy equivalent: 551 g/Eq, Average degree of polymerization of polyoxyethylene groups n: 23) (weight ratio of polyoxyethylene diglycidyl ether/water=1:19)

Oiling agent 5: 10 wt % ethanol solution of aliphatic polyether compound "ADEKA POLYETHER" (registered trademark) P1000 (polypropylenepolyol (compound having a polyoxyalkylene structure) manufactured by ADEKA Co., Ltd., Molecular weight: 1000, Number of hydroxy groups: 2) (weight ratio of polypropylene polyol/ethanol=1:9)

[Reinforcement Fiber]

As reinforcement fiber, carbon fiber strand "Tenax (registered trademark)" HTS40-12K (manufactured by Teijin Limited, Tensile strength 4.2 GPa, Tensile elastic modulus 240 GPa, Linear expansion coefficient: $-0.5 \times 10^{-6}$/K) was used.

[Liquid Thermosetting Resin]

An amine-curable epoxy resin was used as the matrix resin for the fiber reinforced composite material. The formulation is as follows. The linear expansion coefficient of the cured product was $55 \times 10^{-6}$/K.

(Epoxy Resin)

Tetraglycidyl-4,4'-diaminodiphenylmethane (Araldite (registered trademark) MY721 manufactured by Huntsman Japan KK) 20 parts by mass Triglycidyl-p-aminophenol (Araldite (registered trademark) MY0510 manufactured by Huntsman Japan KK) 30 parts by mass Triglycidyl-m-aminophenol (Araldite (registered trademark) MY0610 manufactured by Huntsman Japan KK) 30 parts by mass Bisphenol-F diglycidyl ether based epoxy resin (Araldite (registered trademark) PY306 manufactured by Huntsman Japan KK) 20 parts by mass

[Curing Agent]

4,4'-diamino-3,3'-diisopropyl-5,5'-dimethyldiphenylmethane (Lonzacure (registered trademark) M-MIPA manufactured by Lonza Japan Co., Ltd.) 67 parts by mass

[Evaluation Method]

(1) Thermal Shock Test

A thermal shock tester (TSA-73EH-W manufactured by ESPEC CO., LTD.) was used to subject the fiber reinforced composite material to 1000 times of thermal cycles. One cycle of the thermal cycle was set to consist of a flat range at −55° C. for 15 minutes, followed by a ramp range reaching 70° C. for 15 minutes, a flat range at 70° C. for 15 minutes, and then a ramp range going back to −55° C. for 15 minutes, which cycle was repeated 1000 times.

(2) Crack Density

The number of cracks after the thermal shock test in the cross section inside the fiber reinforced composite material test piece was measured by microscopic observation. VHX-5000 manufactured by KEYENCE CORPORATION was used as a microscope for observation at a magnification of 200 times. Specifically, the test piece (width 80 mm×length 50 mm×thickness 5 mm) after the thermal shock test was cut into four equal parts of width 40 mm×length 25 mm, and the cut surface in the thickness direction was mirror-polished to give an observation surface for each of the long side and the short side. The microcracks are observed using a microscope in an observation range of 50 mm² or more, and the number of cracks measured is divided by the number of layers and the width of the observation surface to give the value of crack density. The unit of crack density is cracks/(cm·ply). The crack density values obtained from the observations on the long and short sides were averaged to give the final crack density.

(3) Adhered Amount of Treatment Agent

The adhered amount of the treatment agent to the stitching yarn was measured by the following method. The treatment agent was extracted from the stitching yarn by Soxhlet extraction method using a mixed solution of ethanol and benzene as a solvent, the solution containing the treatment agent was dried, and the obtained solid was weighed.

The stitching yarn was dried at 70° C. for 1 hour, and about 5 g was weighed out. (The mass at this time is $M_1$.) Using a mixed solution of ethanol and benzene as a solvent, the mixture was refluxed for 4 hours in accordance with Soxhlet extraction method, and the treatment agent adhered to the stitching yarn was extracted with the solvent. After extraction, the stitching yarn was removed, the solvent was concentrated, the extract was transferred to a weighing bottle (with a tare of $M_2$), dried at 105° C. for 2.5 hours, and then the amount of extract ($M_3$) was measured to determine the adhered amount of oiling agent by the following formula.

Adhered amount of treatment agent [$M$ (mass %)]= $(M_3-M_2)/M_1 \times 100$

Example 1

Stitching yarn 1 was used as the stitching yarn. The stitching yarn was washed with an organic solvent to remove the fiber oiling agent adhering to the surface of the stitching yarn. The stitching yarn was washed by circulation washing for 12 hours using a Soxhlet extractor and a mixed solution of ethanol and benzene as an organic solvent. The stitching yarn after washing was dried in a vacuum dryer for 12 hours. Then, the stitching yarn from which the fiber oiling agent was removed was continuously immersed in the treatment agent solution to apply the treatment agent. Oiling agent 1 was used as the treatment agent solution. Then, after removing excess water with a roller, the stitching yarn was dried at 100° C. for 1 hour using a hot air dryer. The adhered amount of the treating agent after drying was 2.8 wt %.

Four reinforcement fiber sheets with 200 reinforcement fibers unidirectionally drawn and aligned were prepared and laminated by altering angles in the order of −45°, 0°, +45°, 90° to give a laminate sheet of laminated four unidirectionally drawn and aligned reinforcement fiber sheets. Next, the laminate sheet was sewn (stitched) through the laminate sheet using a stitching yarn provided with a treatment agent to give a stitched fiber-reinforced substrate material (reinforcement fiber weight per area per layer: 190 g/m², stitching yarn usage amount: 4 g/m², stitched fiber-reinforced substrate material total weight per area: 764 g/m²).

The obtained stitched fiber-reinforced substrate material was cut into a size of 300×300 mm. Next, six stitched reinforcement fiber fiber-reinforced substrate materials were laminated on a mold release treated aluminum plate of 500×500 mm to form a laminate (preform material [−45°/0°/+45°/90°]$_{3s}$).

Then, using the obtained laminate and the liquid thermosetting resin formulation, a fiber reinforced composite material was manufactured by a resin transfer molding method. First, on the laminate laminated were Release Ply C (manufactured by AIRTECH) of peel cloth, which is a substrate material provided with a mold release function, and Resin Flow 90HT (manufactured by AIRTECH), which is a resin distribution substrate material. Then, hoses for forming a resin injection port and a resin discharge port were arranged, whole the mold was covered with a nylon bag film, sealed with a sealant tape, and the inside was evacuated. Subsequently, the aluminum plate was heated to 120° C., the pressure in the bag was reduced to 5 torr or less, and then the above-mentioned liquid thermosetting resin (33 parts by mass based on 100 parts by mass of the stitched substrate material) heated to 100° C. was injected into the vacuum system through the resin injection port. The injected liquid thermosetting resin filled the bag and was impregnated into the laminate, and under this condition, the temperature was raised to 180° C. and kept at 180° C. for 2 hours to obtain a fiber reinforced composite material.

The crack density was measured using the obtained fiber reinforced composite material. As a result, the crack density was as low as 0.10 cracks/(cm·ply), and a fiber reinforced composite material with less crack generation was obtained.

Comparative Example 1

Stitching yarn 1 was used as the stitching yarn. A stitched fiber-reinforced substrate material and a fiber reinforced composite material were obtained in the same manner as in example 1 except that the stitching yarn was not washed with an organic solvent and the treatment agent was not applied. The crack density was measured using the obtained fiber reinforced composite material. As a result, the generation of microcracks was observed, and the crack density of 0.46 cracks/(cm·ply) was high as compared with example 1.

Example 2

A stitched fiber-reinforced substrate material and a fiber reinforced composite material were obtained in the same manner as in example 1 except that stitching yarn 2 was used as the stitching yarn. The adhered amount of the treating agent of the stitching yarn was 1.2 wt %. The crack density was measured using the obtained fiber reinforced composite material. As a result, the crack density of 0.09 cracks/(cm·ply) was very low, and the fiber reinforced composite material had less crack generation.

Comparative Example 2

Stitching yarn 2 was used as the stitching yarn. A stitched fiber-reinforced substrate material and a fiber reinforced composite material were obtained in the same manner as in example 2 except that the stitching yarn was not washed with an organic solvent and the treatment agent was not applied. The crack density was measured using the obtained fiber reinforced composite material. As a result, the generation of microcracks was observed, and the crack density of 0.24 cracks/(cm·ply) was high as compared with example 2.

Example 3

A stitched fiber-reinforced substrate material and a fiber reinforced composite material were obtained in the same manner as in example 1 except that stitching yarn 3 was used as the stitching yarn. The adhered amount of the treating agent of the stitching yarn was 4.9 wt %. The crack density was measured using the obtained fiber reinforced composite material. The results are shown in Table 1. The obtained fiber reinforced composite material had a very low crack density of 0.10 cracks/(cm·ply), and a fiber reinforced composite material with less crack generation was obtained.

Example 4

A stitched fiber-reinforced substrate material and a fiber reinforced composite material were obtained in the same manner as in example 3 except that oiling agent 2 was used as the treatment agent. The adhered amount of the treating agent of the stitching yarn was 2.4 wt %. The crack density was measured using the obtained fiber reinforced composite material. The results are shown in Table 1. The obtained fiber reinforced composite material had a low crack density of 0.20 cracks/(cm·ply), and a fiber reinforced composite material with less crack generation was obtained.

Example 5

A stitched fiber-reinforced substrate material and a fiber reinforced composite material were obtained in the same manner as in example 3 except that oiling agent 3 was used as the treatment agent. The adhered amount of the treating agent of the stitching yarn was 5.8 wt %. The crack density was measured using the obtained fiber reinforced composite material. The results are shown in Table 1. The obtained fiber reinforced composite material had a very low crack density of 0.13 cracks/(cm·ply), and a fiber reinforced composite material with less crack generation was obtained.

Example 6

A stitched fiber-reinforced substrate material and a fiber reinforced composite material were obtained in the same manner as in example 3 except that oiling agent 4 was used as the treatment agent. The adhered amount of the treating agent of the stitching yarn was 1.8 wt %. The crack density was measured using the obtained fiber reinforced composite material. The results are shown in Table 1. The obtained fiber reinforced composite material had a very low crack density of 0.19 cracks/(cm·ply), and a fiber reinforced composite material with less crack generation was obtained.

Example 7

A stitched fiber-reinforced substrate material and a fiber reinforced composite material were obtained in the same manner as in example 3 except that oiling agent 5 was used as the treatment agent. The adhered amount of the treating agent of the stitching yarn was 1.2 wt %. The crack density was measured using the obtained fiber reinforced composite material. The results are shown in Table 1. The obtained fiber reinforced composite material had a low crack density of 0.28 cracks/(cm·ply), and a fiber reinforced composite material with less crack generation was obtained.

Comparative Example 3

Stitching yarn 3 was used as the stitching yarn. A stitched fiber-reinforced substrate material and a fiber reinforced composite material were obtained in the same manner as in example 3 except that the stitching yarn was not washed with an organic solvent and the treatment agent was not applied. The crack density was measured using the obtained fiber reinforced composite material. The results are shown in Table 1. The fiber reinforced composite material obtained in comparative example 3 was confirmed to have the generation of cracks, and the crack density of 0.54 cracks/(cm·ply) was very high as compared with examples 3 to 7.

TABLE 1

|  | Treatment agent solution | Adhered amount of treatment agent wt % | Crack density cracks/ (cm · ply) |
|---|---|---|---|
| Example 3 | Oiling agent 1 | 4.9 | 0.10 |
| Example 4 | Oiling agent 2 | 2.4 | 0.20 |
| Example 5 | Oiling agent 3 | 5.8 | 0.13 |
| Example 6 | Oiling agent 4 | 1.8 | 0.19 |
| Example 7 | Oiling agent 5 | 1.2 | 0.28 |
| Comparative example 3 | none | — | 0.54 |

CITATION LIST

Patent Literature

[PTL 1] Japanese Unexamined Patent Application Publication (Translation of PCT Application) NO. 2012-511450

Non-Patent Literature

[NPL 1] Pierre-Jacques Liotier et al., Composites: Part A 42 (2011), 425-437

The invention claimed is:

1. A stitched fiber-reinforced substrate material formed by stitching reinforcement fiber sheets made of reinforcement fibers using stitching yarns,
the stitching yarn being a stitching yarn to which an organic compound having a polar group is adhered.

2. The stitched fiber-reinforced substrate material according to claim 1, wherein the reinforcement fiber sheet is a reinforcement fiber sheet made of unidirectionally drawn and aligned reinforcement fiber.

3. The stitched fiber-reinforced substrate material according to claim 2, wherein the reinforcement fiber sheet is formed by laminating a reinforcement fiber sheet made of unidirectionally drawn and aligned reinforcement fiber layer by layer by altering the fiber axial direction.

4. The stitched fiber-reinforced substrate material according to claim 1, wherein the reinforcement fiber sheet is formed by laminating a reinforcement fiber sheet made of unidirectionally drawn and aligned reinforcement fiber layer by layer by altering the fiber axial direction.

5. The stitched fiber-reinforced substrate material according to claim 1, wherein the organic compound having a polar group is a compound having a polyoxyalkylene structure.

6. The stitched fiber-reinforced substrate material according to claim 1, wherein the organic compound having a polar group is a compound having an epoxy group.

7. The stitched fiber-reinforced substrate material according to claim 1, wherein the stitching yarn is a stitching yarn in which an organic compound having a polar group is adhered in an amount of 0.1 to 10 wt % with respect to the mass of the stitching yarn.

8. The stitched fiber-reinforced substrate material according to claim 1, wherein the stitching yarn has a linear expansion coefficient in the fiber axial direction of $-1\times10^{-6}$ to $70\times10^{-6}$/K after heated at 180° C. for 2 hours and then cooled.

9. A preform material comprising: the stitched fiber-reinforced substrate material according to claim 1 and a binder resin of 1 to 20 parts by mass with respect to 100 parts by mass of the stitched fiber-reinforced substrate material.

10. A method for manufacturing a preform material comprising: heating the stitched fiber-reinforced substrate material according to claim 1 and a binder resin under pressure.

11. A fiber reinforced composite material comprising: the stitched fiber-reinforced substrate material according to claim 1 and a matrix resin formulation of 20 to 60 parts by mass with respect to 100 parts by mass of the stitched fiber-reinforced substrate material.

12. A method for manufacturing a fiber reinforced composite material comprising: impregnating a matrix resin into the stitched fiber-reinforced substrate material according to claim 1.

13. A method for manufacturing a stitched fiber-reinforced substrate material, comprising:
stitching a reinforcement fiber sheet made of reinforcement fiber using stitching yarns to which an organic compound having a polar group is adhered.

* * * * *